United States Patent
Joe et al.

(10) Patent No.: US 12,204,525 B2
(45) Date of Patent: Jan. 21, 2025

(54) METHOD AND APPARATUS FOR UPDATING DATA ABOUT MULTIPLE USER IN DATABASE MANAGEMENT SYSTEM

(71) Applicant: TmaxTibero Co., Ltd., Gyeonggi-do (KR)

(72) Inventors: Geonhyoung Joe, Gyeonggi-do (KR); Seunghwan Yoo, Gyeonggi-do (KR); Jaemin Oh, Gyeonggi-do (KR); Joohyun Lee, Gyeonggi-do (KR); Sangyoung Park, Seoul (KR)

(73) Assignee: TMAXTIBERO CO., LTD., Gyeonggi-Do (KR)

( * ) Notice: Subject to any disclaimer, the term of this patent is extended or adjusted under 35 U.S.C. 154(b) by 87 days.

(21) Appl. No.: 18/107,929

(22) Filed: Feb. 9, 2023

(65) Prior Publication Data

US 2024/0168943 A1  May 23, 2024

(30) Foreign Application Priority Data

Nov. 22, 2022 (KR) .......................... 10-2022-0157560

(51) Int. Cl.
*G06F 16/23* (2019.01)
*G06F 16/22* (2019.01)

(52) U.S. Cl.
CPC ........ *G06F 16/2379* (2019.01); *G06F 16/221* (2019.01)

(58) Field of Classification Search
CPC ........................... G06F 16/2379; G06F 16/221
See application file for complete search history.

(56) References Cited

U.S. PATENT DOCUMENTS

| 10,949,413 B2 | 3/2021 | Sonawane et al. |
| 2014/0279929 A1 | 9/2014 | Gupta et al. |
| 2024/0134880 A1* | 4/2024 | Singh .................. G06F 16/9024 |

FOREIGN PATENT DOCUMENTS

KR            101923334 B1     11/2018

* cited by examiner

*Primary Examiner* — Baoquoc N To
(74) *Attorney, Agent, or Firm* — Umberg Zipser LLP

(57) ABSTRACT

Disclosed are methods for updating data for multiple users in a database management system performed by a computing device, comprising: determining whether there is an already modified target row during a modification task for at least one target row; generating at least one reselected target row by reselecting a modification target in the at least one target row when there is the already modified target row; determining whether there is an already modified reselected target row during a modification task for the at least one reselected target row; and omitting the modification task for the at least one reselected target row, performing the modification task for the at least one reselected target row, or performing a rollback for the modification task for the at least one reselected target row according to the type of instruction statement included in the modification query when there is the already modified reselected target row.

14 Claims, 19 Drawing Sheets

FIG. 5

| TYPE OF UPDATE INSTRUCTION STATEMENT | TYPE OF SET PHRASE |
|---|---|
| TYPE 1 | WHEN ONLY CONSTANT IS USED LIKE 'SET C1 = CONSTANT' IN SET PHRASE |
| TYPE 2 | WHEN BEING CONSTITUTED ONLY BY TARGET COLUMN OF UPDATE TARGET DATA TABLE LIKE 'SET C1 = RANDOM C OF T' IN SET PHRASE |
| TYPE 3 | WHEN COLUMN OF ANOTHER TABLE OTHER THAN UPDATE TARGET TABLE IS REFERENCED LIKE 'SET C1 = (SELECT SUM(T2.C1) FROM T2)' IN SET PHRASE, AND MODIFIED TARGET COLUMN IS NOT USED |
| TYPE 4 | WHEN COLUMN OF TABLE OTHER THAN UPDATE TARGET IS REFERENCED LIKE 'SET C1 = (SELECT SUM(T2.C1) FROM T2 WHERE T2.C1 = T1.C1)' IN SET PHRASE, AND MODIFIED TARGET COLUMN IS USED (WHEN CORRELATED COLUMNS ARE INCLUDED) |
| TYPE 5 | WHEN RANDOM NON-DETERMINISTIC FUNCTION IS USED LIKE 'SET C1 = RANCOM()' IN SET PHRASE (HOWEVER, TREATED AS CONSTANT IN CASE OF NON-DETERMINISTIC FUNCTION) |
| TYPE 6 | COLUMN CHANGED IN SET PHRASE OF UPDATE STATEMENT IS NOT USED IN WHERE PHRASE. FOR EXAMPLE, WHEN COLUMN C1 USED FOR SELECTING TARGET ROWSET IN WHERE PHRASE IS CHANGED IN SET PHRASE LIKE "UPDATE T SET C1 = C1 + 1 WHERE C1 = 2" |

FIG. 8

| TIME | USER 1 | USER 2 |
|---|---|---|
| Time 1 | UPDATE T1 SET C1 = C10 WHERE C1 = 1 AND C2 = 6 | |
| Time 2 | SUCCESS IN UPDATE IN ROW IN WHICH C1 = 1 AND C2 = 6 | |
| Time 3 | INSERT INTO T2(C1) VALUES (1) | |
| Time 4 | SUCCESS IN INSERT IN ROW IN WHICH C1 = 1 AT T2 | |
| Time 5 | | UPDATE T1 SET C2 = (SELECT SUM(C1) FROM T2) WHERE C1<= 2 |
| Time 6 | | WAIT BY ROW LOCK |
| Time 7 | COMMIT | |
| Time 8 | | ONLY ROWS IN WHICH C1 <= 2 ARE UPDATED |

FIG. 9A

| T1 | | |
|---|---|---|
| ROW ID | C1 | C2 |
| 0 | 1 | 1 |
| 1 | 1 | 2 |
| 2 | 1 | 3 |
| 3 | 1 | 4 |
| 4 | 1 | 5 |
| 5 | 1 | 6 |
| 6 | 2 | 7 |
| 7 | 2 | 8 |
| 8 | 2 | 9 |
| 9 | 2 | 10 |

FIG. 9B

| T2 | |
|---|---|
| ROW ID | C1 |
| 0 | 1 |

FIG. 10A

| \multicolumn{6}{c}{T1} | | | | | |
|---|---|---|---|---|---|
| ROW ID | LOCK OWNER | C1 | C2 | LOG INFORMATION (USER 1) | LOG INFORMATION (USER 2) |
| 0 |  | 1 | 1 |  |  |
| 1 |  | 1 | 2 |  |  |
| 2 |  | 1 | 3 |  |  |
| 3 |  | 1 | 4 |  |  |
| 4 |  | 1 | 5 |  |  |
| 5 | USER 1 | 10 | 6 | 10<-1 |  |
| 6 |  | 2 | 7 |  |  |
| 7 |  | 2 | 8 |  |  |
| 8 |  | 2 | 9 |  |  |
| 9 |  | 2 | 10 |  |  |

FIG. 10B

| ROW ID TABLE OF T1 (USER 1) |
|---|
| ROWID 5 |

FIG. 11A

| ROW ID | LOCK OWNER | C1 | LOG INFORMATION (USER 1) | LOG INFORMATION (USER 2) |
|---|---|---|---|---|
| 0 | | 1 | | |
| 1 | USER 1 | 1 | 1 | |

| ROW ID TABLE OF T2 (USER 1) |
|---|
| ROWID 5 |

FIG. 12A

| ROW ID | LOCK OWNER | C1 | C2 | LOG INFORMATION (USER 1) | LOG INFORMATION (USER 2) |
|---|---|---|---|---|---|
| | | | T1 | | |
| 0 | USER 2 | 1 | 1 | | 1->1 |
| 1 | USER 2 | 1 | 1 | | 1->2 |
| 2 | USER 2 | 1 | 1 | | 1->3 |
| 3 | USER 2 | 1 | 1 | | 1->4 |
| 4 | USER 2 | 1 | 1 | | 1->5 |
| 5 | USER 1 | 10 | 6 | 10->1 | |
| 6 | | 2 | 7 | | |
| 7 | | 2 | 8 | | |
| 8 | | 2 | 9 | | |
| 9 | | 2 | 10 | | |

FIG. 12B

| ROW ID TABLE OF T1 (USER 1) | ROW ID TABLE OF T1 (USER 2) |
|---|---|
| ROWID 5 | ROWID 0 |
| | ROWID 1 |
| | ROWID 2 |
| | ROWID 3 |
| | ROWID 4 |
| | |

FIG. 13A

| \multicolumn{6}{c}{T1} |
| ROW ID | LOCK OWNER | C1 | C2 | LOG INFORMATION (USER 1) | LOG INFORMATION (USER ) |
|---|---|---|---|---|---|
| 0 | USER 2 | 1 | 2 |  | 2->1->1 |
| 1 | USER 2 | 1 | 2 |  | 2->1->2 |
| 2 | USER 2 | 1 | 2 |  | 2->1->3 |
| 3 | USER 2 | 1 | 2 |  | 2->1->4 |
| 4 | USER 2 | 1 | 2 |  | 2->1->5 |
| 5 |  | 10 | 6 | 10->1 |  |
| 6 | USER 2 | 2 | 2 |  | 2->7 |
| 7 | USER 2 | 2 | 2 |  | 2->8 |
| 8 | USER 2 | 2 | 2 |  | 2->9 |
| 9 | USER 2 | 2 | 2 |  | 2->10 |

FIG. 13B

| ROW ID TABLE OF T1 (USER 1) | ROW ID TABLE OF T1 (USER 2) |
|---|---|
| ROWID 5 | ROWID 0 |
| | ROWID 1 |
| | ROWID 2 |
| | ROWID 3 |
| | ROWID 4 |
| | |
| | ROWID 6 |
| | ROWID 7 |
| | ROWID 8 |
| | ROWID 9 |

METHOD AND APPARATUS FOR UPDATING DATA ABOUT MULTIPLE USER IN DATABASE MANAGEMENT SYSTEM

CROSS-REFERENCE TO RELATED APPLICATIONS

This application claims priority to and the benefit of Korean Patent Application No. 10-2022-0157560 filed in the Korean Intellectual Property Office on Nov. 22, 2022, the entire contents of which are incorporated herein by reference.

TECHNICAL FIELD

The present disclosure relates to a database management system, and particularly, to a method and an apparatus for supporting a consistent data update for multiple users in a database management system.

BACKGROUND ART

In general, a Database Management System (DBMS) supports services in which multiple users can update at least some of the data stored in a database at the same time. Such data is stored in the database in the form of a plurality of tables, and each table can include one or more rows, and each row can include one or more columns and data values for each column.

It is assumed that a database system provides the service is constituted by a plurality of user devices, and a database server related to the database, and when the plurality of user devices simultaneously accesses the database in order to update a specific row of a specific data table stored in the database, a first user device first accesses the database. When the database server performs a modification task for the corresponding row according to a request of the first user device, a row lock is triggered, so the remaining user devices other than the first user device cannot conduct a modification or reading task for the specific row until completing the modification task according to the request of the first user device. Through this, a consistent modification task can be guaranteed for the corresponding row.

Next, when a second user device requests the database server in order to update the corresponding row, a data value corresponding to the specific row is already updated, so the specific row at the time when the second user device requests the modification task may not be a target row to be modified by the second user device. In this case, the database server can roll back the modification task performed by the request of the first user, and conduct the modification task (re-modification task, re-update) again. Thus, if multiple users want to update at least some of the data at the same time, there is a problem in which the cost of rolling back the previously performed modification task and performing the modification task again.

Therefore, proposed are a method and an apparatus for efficient data update for minimizing rollback and re-modification tasks while supporting a consistent update service in a DBMS environment in which there are multiple user devices.

SUMMARY OF THE INVENTION

The present disclosure has been made in an effort to provide a method and an apparatus for updating data for multiple users in a database management system.

However, technical objects of the present disclosure are not restricted to the technical object mentioned above. Other unmentioned technical objects will be apparently appreciated by those skilled in the art by referencing to the following description.

In order to solve the foregoing object, an exemplary embodiment of the present disclosure discloses a method for updating data for multiple users in a database management system (DBMS), which is performed by a computing device, the method comprising: determining whether there is an already modified target row during a modification task for the at least one target row; generating at least one reselected target row by reselecting a modification target in the at least one target row when there is the already modified target row;
  determining whether there is an already modified reselected target row during a modification task for the at least one reselected target row; and omitting the modification task for the at least one reselected target row, performing the modification task for the at least one reselected target row, or performing a rollback for the modification task for the at least one reselected target row according to the type of instruction statement included in the modification query when there is the already modified reselected target row.

Alternatively, the instruction statement includes a SET phrase for designating the column to be modified or updated or a data value of the column for modification or update, or includes an UPDATE instruction statement including a WHERE phrase for designating the SET phrase and a condition, and the type of instruction statement included in the modification query includes at least one of a first type configured to modify the at least one target row by using a constant, a second type configured to modify the at least one target row by using at least one target column to be modified of a target data table to be modified, a third type configured to modify the at least one target row by referring to at least one column of another data table other than the target data table without using the at least one target column, a fourth type configured to modify the at least one target row by using the at least one target column and referring to at least one column of another data table other than the target data table, a fifth type configured to modify the at least one target row by using a random non-deterministic function, or a sixth type configured to change a data value of a column used for selecting a target row (rowset) in the WHERE phrase in the SET phrase.

Alternatively, the omitting of the modification task for the at least one reselected target row, the performing of the modification task for the at least one reselected target row, or the performing of the rollback for the modification task for the at least one reselected target row according to the type of instruction statement included in the modification query includes omitting the modification task for the at least one reselected target row when the modification query includes the first type or second type UPDATE instruction statement, further includes performing the modification task for the at least one reselected target row when the modification query includes the third to fifth type UPDATE instruction statement, and further includes performing the rollback for the modification task the at least one reselected target row when the modification query includes the first to fifth type UPDATE instruction statement.

Alternatively, the performing of the modification task for the at least one reselected target row includes determining a first data value for a first reselected target row among the at least one reselected target row based on the modification query when the modification query includes the third or fifth type UPDATE instruction statement, determining a second data value for the first reselected target row based on log information prestored for the first reselected target row, and determining whether the first data value and the second data value coincide with each other, and when the first data value and the second data value does not coincide with each other, updating the data value for the first reselected target row to the first data value, and further includes maintaining the data value for the first reselected target row to the second data value when the first data value and the second data value coincide with each other.

Alternatively, the log information includes a data value updated last for the first reselected target row, and the determining of the second data value for the first reselected target row is determining the data value updated last as the second data value.

Alternatively, the performing of the modification task for the at least one reselected target row includes acquiring the original data value for the first reselected target row from the log information prestored for the first reselected target row among the at least one reselected target row when the modification query includes the type 4 UPDATE instruction statement, determining a first data value for the first reselected target row by using the original data value based on the modification query, determining a second data value for the first reselected target row based on log information prestored for the first reselected target row, and determining whether the first data value and the second data value coincide with each other, and when the first data value and the second data value does not coincide with each other, updating the data value for the first reselected target row to the first data value, and further includes maintaining the data value for the first reselected target row to the second data value when the first data value and the second data value coincide with each other.

Alternatively, the log information includes the original data value for the first reselected target row and a data value updated last for the first reselected target row, and the determining of the second data value for the first reselected target row is determining the data value updated last as the second data value.

Alternatively, the determining of whether there is the already modified reselected target row includes determining a reselected target row having a row ID stored in the row ID table among the at least one reselected target row as the already modified reselected target row by using a prestored row ID table.

Alternatively, the row ID table is configured to store a row ID for a row in which the data value is modified.

Alternatively, the method further comprising: performing the modification task for at least one target row based on the modification query when the already modified target row is not present.

In order to solve the foregoing object, an exemplary embodiment of the present disclosure discloses a computer program stored in a computer-readable storage medium, wherein the computer program allows one or more processors to execute the following operations for updating data for multiple users in a database management system (DBMS) when the computer program is executed by the one or more processors, the operations comprising: an operation of receiving a modification query for modifying at least one target row of a target data table from a user terminal, the at least one target row including one or more columns; an operation of determining whether there is an already modified target row during a modification task for the at least one target row; an operation of generating at least one reselected target row by reselecting a modification target in the at least one target row when there is the already modified target row; an operation of determining whether there is an already modified reselected target row during a modification task for the at least one reselected target row; and an operation of omitting the modification task for the at least one reselected target row, performing the modification task for the at least one reselected target row, or performing a rollback for the modification task for the at least one reselected target row according to the type of instruction statement included in the modification query when there is the already modified reselected target row.

In order to solve the foregoing object, an exemplary embodiment of the present disclosure discloses a computing device for updating data for multiple users in a database management system (DBMS), comprising: at least one processor; and a memory, wherein at least one processor is configured to receive a modification query for modifying at least one target row of a target data table from a user terminal, the at least one target row including one or more columns, determine whether there is an already modified target row during a modification task for the at least one target row, generate at least one reselected target row by reselecting a modification target in the at least one target row when there is the already modified target row, determine whether there is an already modified reselected target row during a modification task for the at least one reselected target row, and omit the modification task for the at least one reselected target row, perform the modification task for the at least one reselected target row, or perform a rollback for the modification task for the at least one reselected target row according to the type of instruction statement included in the modification query when there is the already modified reselected target row.

According to some exemplary embodiments of the present disclosure, the present disclosure can provide a method and an apparatus for efficiently updating data, which minimize a time and cost required for rollback and re-modification tasks by multiple users, by omitting, performing, rolling back a modification task according to a form of an instruction statement included in a modification query when rowset reset for target rows is performed during a modification task for a random data table by modification queries of multiple users.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

FIG. 5 is a diagram illustrating the UPDATE instruction statement for the modification target data table based on types of a plurality of SET phrases as a table type according to an exemplary embodiment of the present disclosure.

FIG. 8 is an exemplary diagram for describing a method for performing a data modification task at least simultaneously for multiple user terminals according to an exemplary embodiment of the present disclosure.

FIGS. 9A and 9B are exemplary diagrams illustrating an original data value of each target column included in a modification target data table according to an exemplary embodiment of the present disclosure.

FIGS. 10A and 10B are exemplary diagrams illustrating a modified target data table at the second time according to an exemplary embodiment of the present disclosure.

FIGS. 11A and 11B are exemplary diagrams illustrating a target data table modified by a processor at a third time according to an exemplary embodiment of the present disclosure.

FIGS. 12A, 12B, 13A and 13B are exemplary diagrams illustrating a target data table modified by the modification query of the second user terminal according to an exemplary embodiment of the present disclosure.

DETAILED DESCRIPTION

Figure 1:
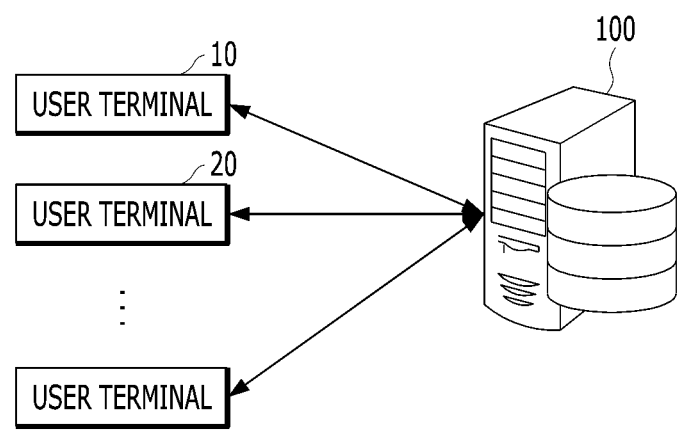
FIG. 1 is a configuration diagram of an exemplary database system for updating data for multiple users in a database management system according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, 'transaction' as a minimum unit task (atomic set) of operations performed in a database may mean a set of a series of operations.

In the present disclosure, 'log' may mean consecutive sets of log records and may be used for recording a change related operation.

FIG. 1 is a configuration diagram of an exemplary database system for updating data for multiple users in a database management system according to an exemplary embodiment of the present disclosure.

Referring to FIG. 1, the corresponding system may include a plurality of user terminals 10, 20, . . . , which request modification for data stored in a database 140 by accessing a database server 100 and the database server 100 modifying the data according to a request. Components illustrated in FIG. 1 are exemplary and additional components may exist or some of the components may be omitted.

According to some exemplary embodiments of the present disclosure, the user terminals 10, 20, . . . , and the database server 100 may mutually transmit and receive data for supporting reading/writing for multiple users in the database management system according to some exemplary embodiments of the present disclosure through a wireless communication network.

The user terminals 10, 20, . . . , (hereinafter, referred to as a 'user terminal 10'), which mean a predetermined type of node(s) in the database system, may include, for example, a predetermined electronic device having connectivity with a personal computer (PC), a laptop computer, a workstation, a terminal, and/or the network. Further, the user terminal 10 may include a predetermined server implemented by at least one of agent, application programming interface (API), and plug-in. In addition, the user terminal 10 may include an application source and/or a client application.

Specifically, the user terminal 10 transfers a modification request (i.e., a modification query) to the database server 100 to allow the database server to modify at least a part of a data table stored in the database according to the modification request. For example, the user terminal 10 may read the data stored in the database or generate a query for writing the data. The database may store the data in the form of a table, and include at least one data table. Each data table may include one or more rows, and each row may include one or more columns and a data value for each column.

According to some exemplary embodiments of the present disclosure, the user terminal 10 may be a predetermined entity which includes a control unit, a storage unit (a memory and a persistent storage medium), and a communication unit to process, store, and transceive predetermined data.

In the present disclosure, the control unit may be constituted by one or more cores, and may include a predetermined type of processor for generating a signal used in the user terminal 10 by executing instructions stored in a memory, such as a central processing unit (CPU), a micro controller unit (MCU), etc., of the user terminal 10. The processor may generate a signal used in the user terminal 10 according to an exemplary embodiment of the present disclosure by reading a computer program stored in the memory.

The storage unit in the present disclosure may store a program for an operation of the control unit, and also temporarily or persistently store input/output data. The storage unit may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The storage unit may be operated by the control of the control unit. Further, in the present disclosure, the memory and the storage unit may be used interchangeably with each other.

In the present disclosure, the communication unit may connect the user terminal 10 to communication with various devices. Specifically, the communication unit is connected to an external device to transmit and receive data for generating the signal used in the user terminal 10.

The database server 100 as a device for modifying or updating at least a part of the data table stored in the database according to the query received from the user terminal 10 may include, for example, a predetermined type of computer system or computer device such as computer, a digital processor, a portable device, and a device controller.

According to some exemplary embodiments of the present disclosure, the database server 100 may be a predetermined entity which includes a processor, a storage unit (a memory and a persistent storage medium), and a communication unit to process, store, and transmit and receive predetermined data.

In the present disclosure, the processor may be constituted by one or more cores and may include predetermined type of processors for generating a code for extracting a signal used in the control unit 10 by executing instructions stored in the memory, which include a central processing unit (CPU), a general purpose graphics processing unit (GPGPU), a tensor processing unit (TPU), a graphic processing unit (GPU), and the like of the computing device. The processor may support an update for multiple users according to the exemplary embodiment of the present disclosure by reading the computer program stored in the memory.

In the present disclosure, the DBMS as a program for permitting the database server 100 to perform predetermined types of operations of the database including retrieval, insertion, modification, and/or deletion of required data, and generating the index and accessing the index may be implemented by the processor in the memory of the database server 100.

In the present disclosure, the memory may store a program for the operation of the processor and temporarily or persistently store input/output data. The memory may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. The memory may be operated by control by the processor. Further, in the present disclosure, the memory and the storage unit may be used interchangeably with each other.

The storage unit according to the present disclosure may include the database storing the data in the form of the table. For example, the database server 100 may store and manage the data by using a structural query language (SQL).

In the present disclosure the communication unit may connect the database server 100 to communication with various devices. Specifically, the communication unit may transmit and receive data to and from a plurality of user terminals.

Figure 2:
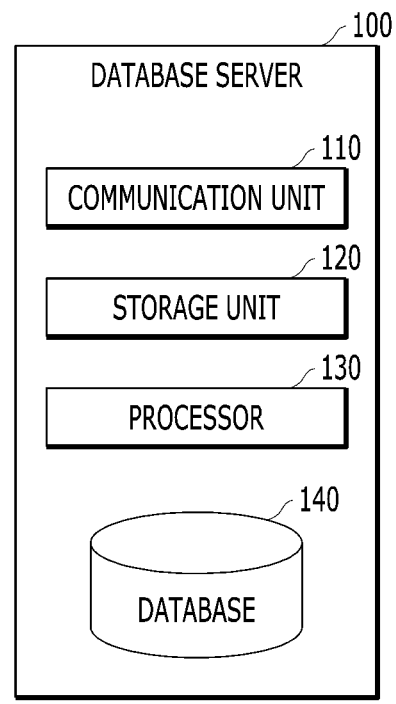
FIG. 2 is a block diagram of a database server according to an exemplary embodiment of the present disclosure.

FIG. 2 is a block diagram of a database server according to an exemplary embodiment of the present disclosure. The configuration of the database server 100 illustrated in FIG. 2 is only an example illustrated through simplification. In an exemplary embodiment of the present disclosure, the database server 100 may include other components for performing a computing environment of the database server 100 and only some of the disclosed components may constitute the database server 100.

The database server 100 may include a communication unit 110, a storage unit 120, a processor 130, and a database 140. However, components described above are not required in implementing the database server 100 and the database server 100 may thus have components more or less than components listed above. Here, respective components may be configured as separate chips, modules, or devices and may be included in one device.

The communication unit 110 network according to the exemplary embodiment of the present disclosure may include any type of wired/wireless Internet module for network connection. Further, the communication unit 110 may use various types of well-known wired networks and wireless networks.

According to some exemplary embodiments of the present disclosure, the communication unit 110 connects the database server 100 to communicate with an external device. The communication unit 110 is connected to the user terminal 10 by using wired/wireless communication to transmit and receive various data used for data update.

According to an exemplary embodiment of the present disclosure, the storage unit 120 may store any type of information generated or determined by the processor 130 or any type of information received by the communication unit 110. According to some exemplary embodiments of the present disclosure, the storage unit 120 may store various data for supporting reading/writing for multiple users. In particular, the storage unit 120 may store the DBMS which is a program for permitting the database server 100 to perform operations such as retrieval, insertion, modification, and/or deletion of required data.

The storage unit 120 may include a memory and/or a persistent storage medium. The storage unit 120 may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. The server 100 may operate in connection with a web storage performing a storing function of the storage unit 120 on the Internet. The description of the storage unit is just an example and the present disclosure is not limited thereto.

The processor 130 may be constituted by one or more cores and may include processors for data analysis and processing, which include a central processing unit (CPU), a general purpose graphics processing unit (GPGPU), a tensor processing unit (TPU), and the like of the computing device.

The processor 130 may read a computer program stored in the storage unit 120 to perform a processing for data update for multiple users in a database management system according to an exemplary embodiment of the present disclosure. For example, the processor 130 may read the DBMS stored in the storage unit 120 to permit the database server 100 to perform operations such as retrieval, insertion, modification, and/or deletion of required data.

Specifically, for the data update for the multiple users in the database management system, the processor 130 may receive, from the user terminal 10, a modification query for modifying at least one target row in the data table stored in the database 140. Here, the modification query may be expressed as the structural query language (SQL), and may include an instruction statement UPDATE for modifying or updating at least one target row. The instruction statement UPDATE may include a phrase SET for designating a target data table to be modified or updated, a target column to be modified or updated, and a data value for the corresponding target column, or phrase WHERE for designing the phrase SET and a modification condition.

Subsequently, the processor 130 may determine whether there is an already modified target row during the modification task for at least one target row. When there is the already modified target row, the processor 130 may reselect a modification target in at least one target row to determine at least one reselected target row. Since the multiple users are capable of simultaneously reading/writing data in the database management system, some target rows may be modified by the modification query of another user terminal 20 while the modification task is performed according to the modification query of the user terminal. In this case, the processor 130 may not perform the rollback for the modification task, and determine at least one remaining target row which is not yet modified as at least one reselected target row. Here, the rollback may mean an operation of returning to a previous state by canceling the modification task.

When the already modified target row is not present, the processor 130 may perform the modification task for at least one target row based on the modification query.

The processor 130 may determine whether there is the already modified reselected target row during the modification task for at least one reselected target row. When there is the already modified reselected target row, the processor 130 may omit the modification task for at least one reselected target row according to the type of instruction statement included in the modification query, or perform the modification task or perform the rollback for at least one reselected target row. When the already modified reselected target row is not present, the processor 130 may perform the modification task for at least one reselected target row based on the modification query. This will be described in detail with reference to FIG. 3.

The database 140 may store at least one data table including the data value. The data table may include one or more rows as described above, and each row may include one or more columns and a data value for each column. For example, the data table may be an SQL table, but is not limited thereto.

Hereinafter, a method for updating data for multiple users in the database management system will be described in detail with reference to FIGS. 3 to 13. In the presented exemplary embodiment, operations of FIGS. 3 to 13 may be performed by the processor 130 of the database server 100.

Figure 3:
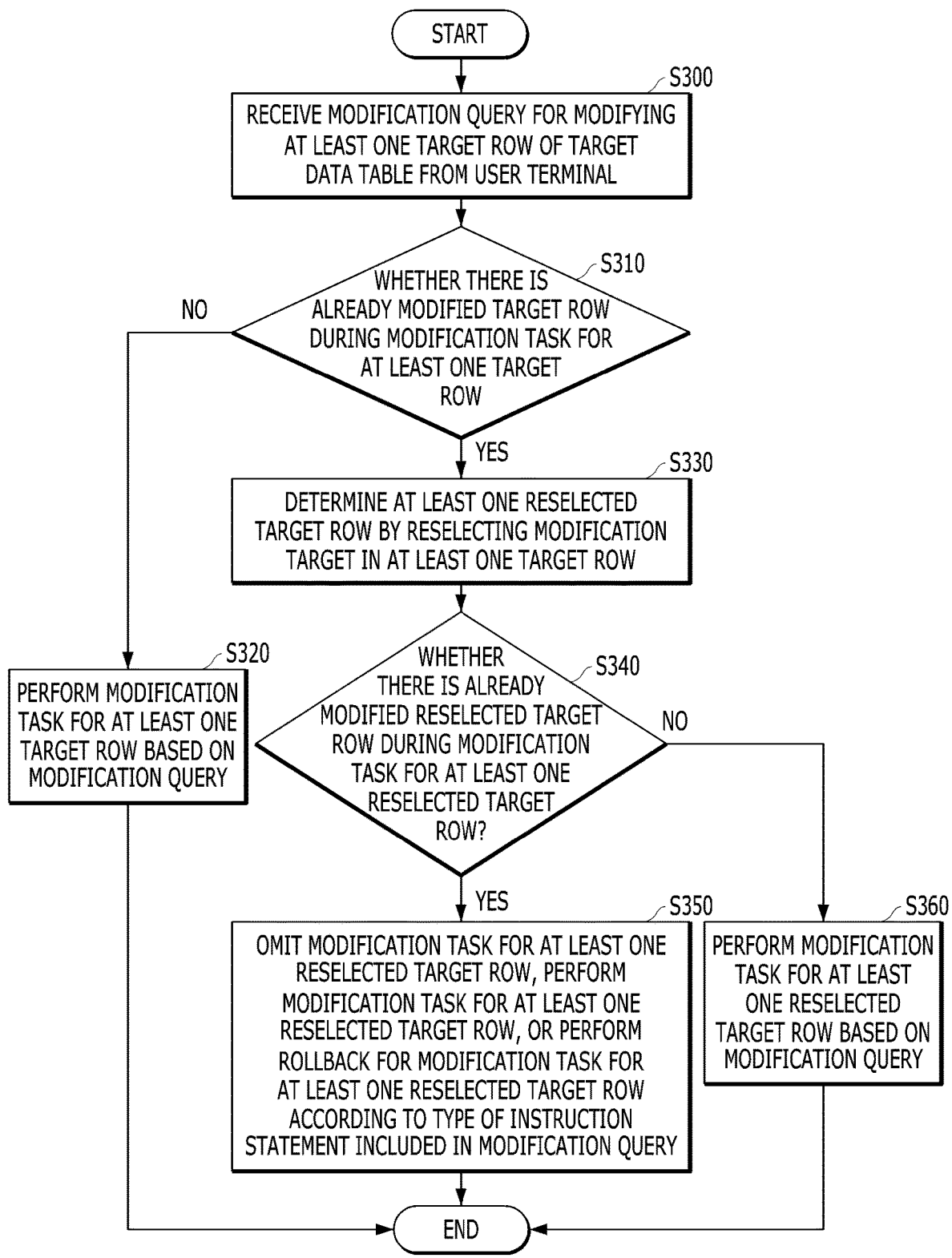
FIG. 3 is a flowchart for describing an example of a method for updating data for multiple users in a database management system according to an exemplary embodiment of the present disclosure.

FIG. 3 is a flowchart for describing an example of a method for updating data for multiple users in a database management system according to an exemplary embodiment of the present disclosure.

Referring to FIG. 3, the processor 130 receives the modification query for modifying at least one target row of a target data table from the user terminal 10 (S300). For example, the modification query may be expressed as an SQL instruction statement such as 'UPDATE T SET C1=C1+1 WHERE C2=2'. Here, T may mean a modification target data table, C1 may mean a modified target column of the corresponding modification target table, and 'C2=2' may mean the modification condition. In other words, the corresponding modification query may include an instruction statement of updating the data table T so as to allocate a data value of a column C1 to 'C1+1' with respect to at least one row in which a data value of a column C2 corresponds to '2' in the data table T.

The processor 130 determines whether there is an already modified target row during the modification task for at least one target row (S310), and determines at least one reselected target row by reselecting the modification target in at least one target row when there is the already modified target row (S330). When the already modified target row is not present, the processor 130 performs the modification task for at least one target row based on the modification query (S320).

In order to determine whether there is the already modified target row, the processor 130 may prestore a row ID table (Stacked-Rowset table) storing a row ID for a row in which the data value is modified. When a data value for a specific row is modified, the processor 130 may store the row ID for the specific row in the row ID table, and store log information for the specific row. Here, the log information may include a past modified history (i.e., undo log) for the data value of the specific row. The undo log may be a set of past modified (or updated) data values (i.e., a set of data values (i.e., recorded last (or updated (or modified) up to most recently). For example, when an original data value of a specific column of the specific row is '1', and is modified to '2' in the modification task, the processor 130 may store the log information for the corresponding column as '2→1' in the modification task of the specific column.

Specifically, the processor 130 may determine whether there is a target row already storing the row ID in the row ID table while performing the modification task for at least one target row based on the modification query. When there is the target row already storing the row ID in the row ID table, the processor 130 may determine the corresponding target row as the already modified target row. The processor 130 may not perform the rollback for the modification task which is performed up to now, and determine at least one target row which is not yet modified as at least one reselected target row.

The processor 130 determines whether there is the already modified reselected target row during the modification task for at least one reselected target row (S340), and omits the modification task for at least one reselected target row according to the type of instruction statement included in the modification query, or performs the modification task for at least one reselected target row, or rolls back the modification task for at least one reselected target row when there is the already modified reselected target row (S350).

Specifically, the processor 130 may determine whether there is a reselected target row already storing the row ID in the row ID table while performing the modification task for at least one reselected target row or at the time of performing the modification task for at least one reselected target row. As described above, since it is possible for multiple users to simultaneously access and read/write data, the database management system may also perform the modification task by another user terminal while reselecting the modification target and performing the modification task for the reselected modification target, or at the time of performing the modification task.

When there is the already modified reselected target row, the processor 130 may omit the modification task according to the type of the UPDATE instruction statement included in the modification query, or perform the modification task, or perform roll back the modification task. This will be described in detail with reference to FIG. 4 below.

When the already modified reselected target row is not present, the processor 130 performs the modification task for at least one reselected target row based on the modification query (S360). For example, the processor 130 may update the data table T so as to allocate a data value of a column C1 to C1+1' with respect to at least one row in which a data value of a column C2 corresponds to '2' in the data table T according to the instruction statement.

Hereinafter, referring to FIGS. 4 and 5, a method for omitting the modification task according to the type of UPDATE instruction statement included in the modification query, performing the modification task, or performing the rollback task when there is the already modified reselected target row will be described in detail.

Figure 4:
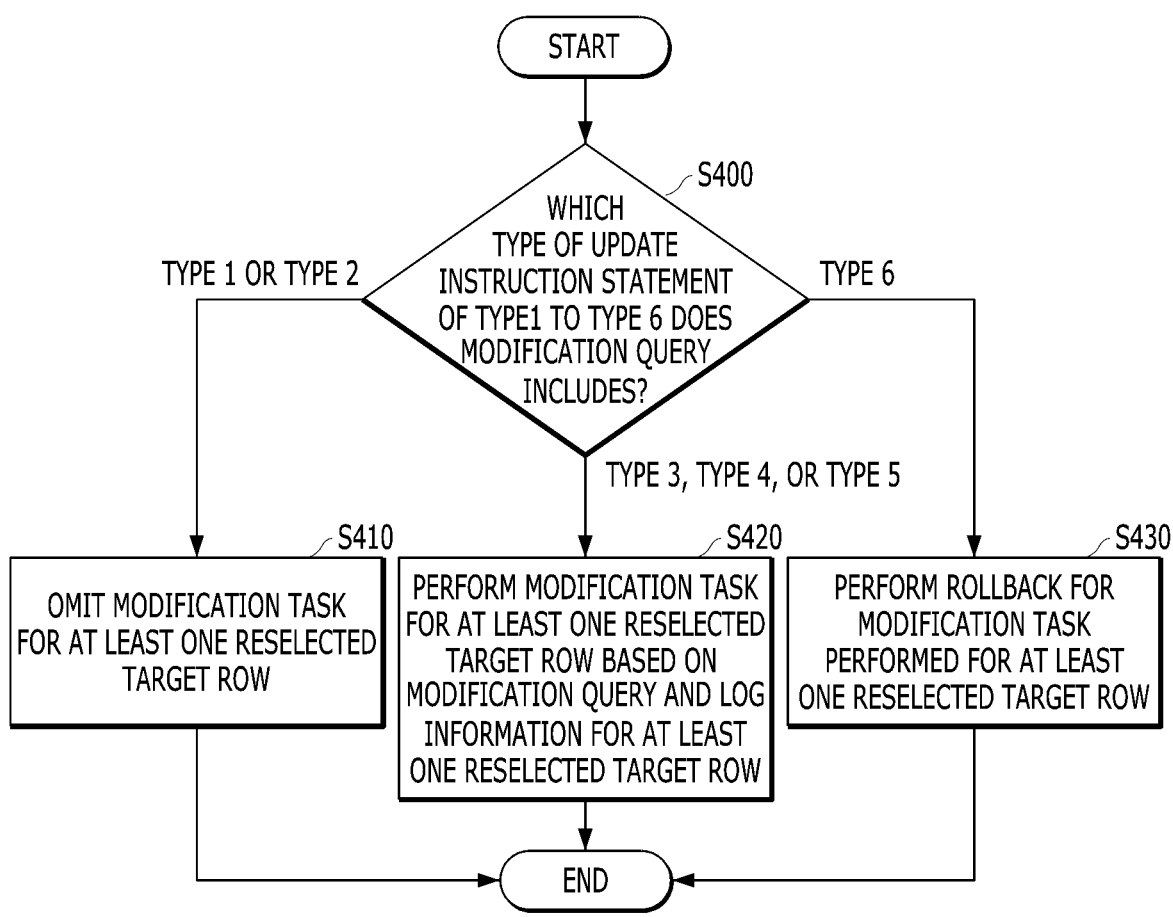
FIG. 4 is a flowchart for describing an example of a method for omitting the modification task according to the type of UPDATE instruction statement included in the modification query, performing the modification task, or performing the rollback task according to an exemplary embodiment of the present disclosure.

FIG. 4 is a flowchart for describing an example of a method for omitting the modification task according to the type of UPDATE instruction statement included in the modification query, performing the modification task, or performing the rollback task according to an exemplary embodiment of the present disclosure, and FIG. 5 is a diagram illustrating the UPDATE instruction statement for the modification target data table based on types of a plurality of SET phrases as a table type according to an exemplary embodiment of the present disclosure.

Referring to FIGS. 4 and 5, the processor 130 determines whether the modification query includes any type of UPDATE instruction statement among types 1 to 6 (S400) and omits the modification task for at least one reselected target row when the modification query includes type 1 or type 2 UPDATE instruction statement (S410).

Specifically, when the modification query includes the type 1 and type 2 UPDATE instruction statements, each of at least one reselected target row is the already modified row, and the row lock occurs, so the processor 130 may not perform the modification task for each of at least one reselected target row. In the present disclosure, the row lock may correspond to row level lock, and mean a lock which may be allocated by the unit of the row of the table. As an example, the row lock may include a shared lock representing a lock for read and an exclusive lock representing a lock for write.

Next, when the modification query includes a type 3, type 4, or type 5 UPDATE instruction statement, the processor 130 performs the modification task for at least one reselected target row based on the modification query and the log information for at least one reselected target row (S420).

Specifically, when the modification query includes the type 3 UPDATE instruction statement, another table other than the update target table is modified by another user terminal 20, and a data value of another table may be changed, so the processor 130 may determine to perform the modification task for each of at least one reselected target row. In order to determine to perform the modification task, the processor 130 may use the log information prestored for each reselected target row. This will be described in detail with reference to FIG. 6 below.

Figure 6:
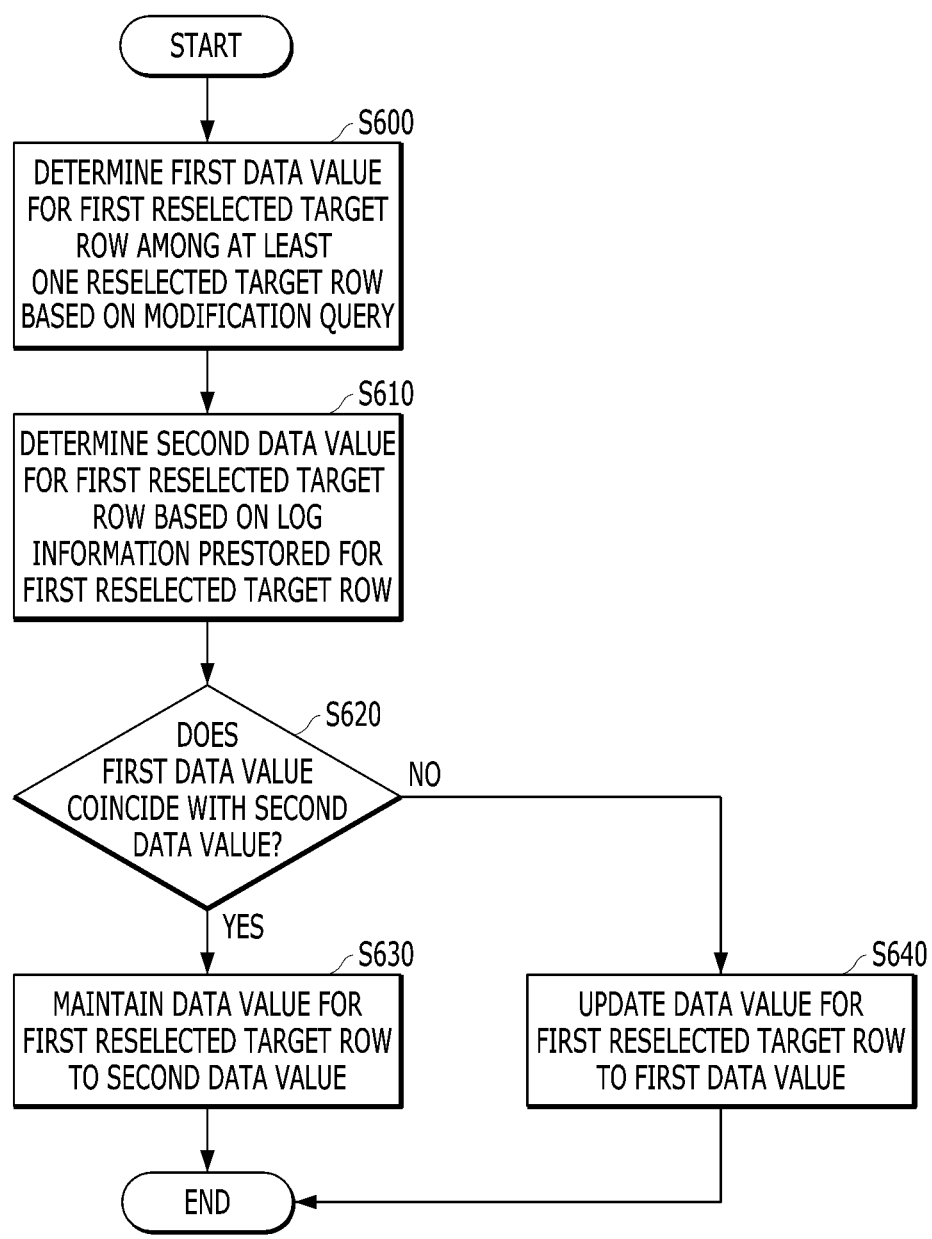
FIG. 6 is a flowchart for describing an example of a method for performing the modification task for at least one reselected target row when the modification query includes the type 3 UPDATE instruction statement according to an exemplary embodiment of the present disclosure.

FIG. 6 is a flowchart for describing an example of a method for performing the modification task for at least one reselected target row when the modification query includes the type 3 UPDATE instruction statement according to an exemplary embodiment of the present disclosure.

Referring to FIG. 6, the processor 130 determines a first data value for a first reselected target row among at least one reselected target row based on the modification query (S600). For example, when the modification query includes the SET phrase such as 'SET C1=(SELECT SUM(T2·C1) FROM T2)', the processor 130 may determine a sum of data values for row-specific column C1 in the data table T2 which is not the update target as a data value (i.e., the first data value for the first reselected target row) of the column C1 in the update target data table T1.

The processor 130 determines a second data value for the first reselected target row based on the log information prestored for the first reselected target row (S610). For example, the processor 130 may determine a data value last modified in the log information for the column C1 of the target data table T1 as the second data value for the first reselected target row.

It is determined whether the first data value and the second data value coincide with each other (S620), and when the first data value and the second data value coincide with each other, the processor 130 maintains the data value for the first reselected target row as the second data value (S630). When the first data value and the second data value do not coincide with each other, the processor 130 updates the data value for the first reselected target row to the first data value (S640).

In various exemplary embodiments, when the modification query includes the type 4 UPDATE instruction statement, another table other than the update target table is modified by another user terminal 20, and a data value of another table may be changed, so the processor 130 may determine to perform the modification task for each of at least one reselected target row. The type 4 UPDATE instruction statement includes correlate columns T2·C1 and T1·C1 in the WHERE phrase. Since the data values of the correlated columns have been modified before reselection, the processor 130 may perform the modification task by using log information for the correlated columns. This will be described in detail with reference to FIG. 7.

Figure 7:
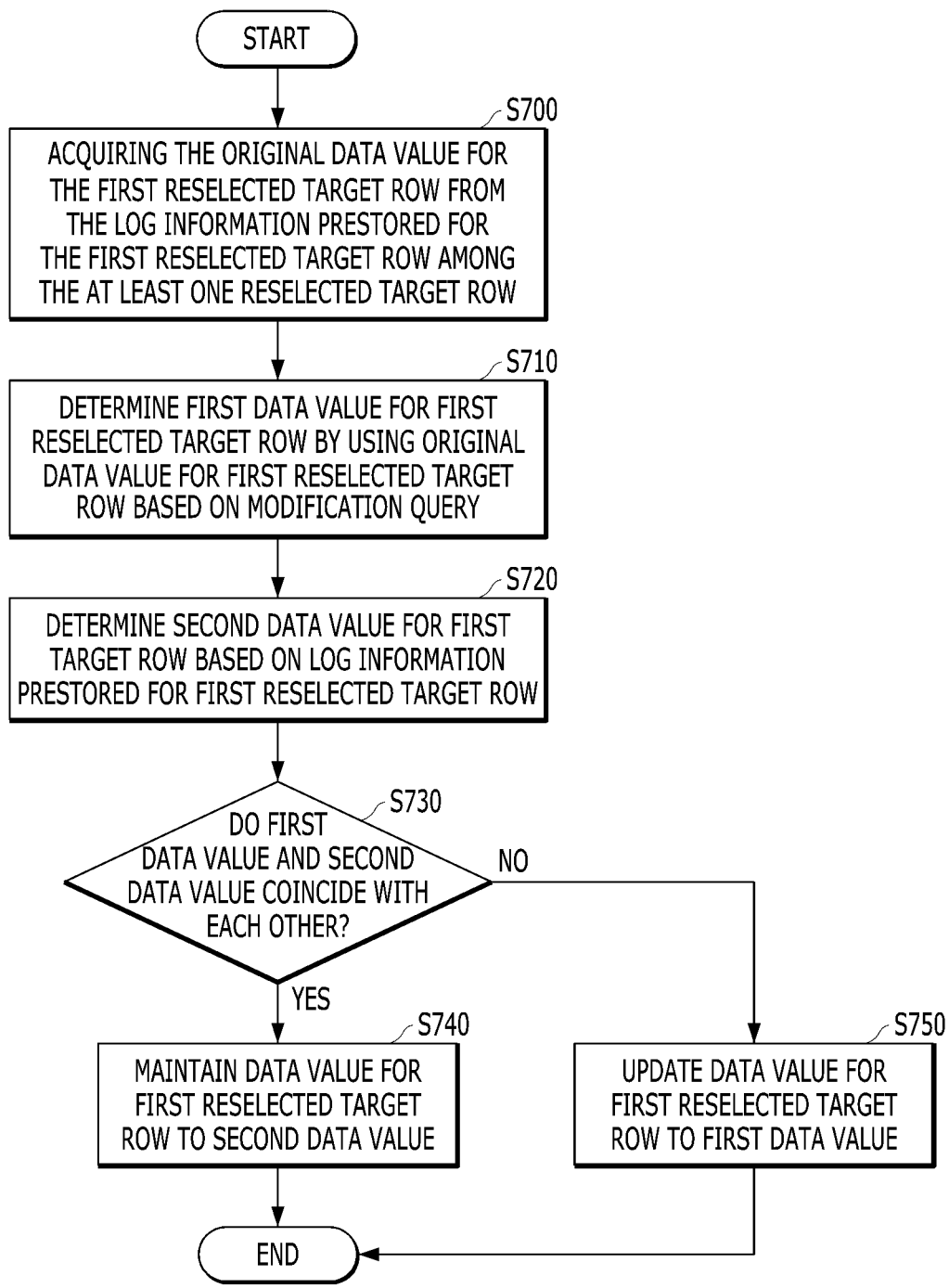
FIG. 7 is a flowchart for describing an example of a method for performing the modification task for at least one reselected target row when the modification query includes the type 4 UPDATE instruction statement according to an exemplary embodiment of the present disclosure.

FIG. 7 is a flowchart for describing an example of a method for performing the modification task for at least one reselected target row when the modification query includes the type 4 UPDATE instruction statement according to an exemplary embodiment of the present disclosure.

Referring to FIG. 7, the processor 130 acquires an original data value for the first reselected target row from the log information prestored for the first reselected target row among at least one reselected target row (S700). Here, the first reselected target row may mean a reselected target row modified before the reselection. In this case, the log information for the first reselected target row may include a set of data values modified up to last (i.e., up to most recently) from the original data value.

The processor 130 determines the first data value for the first reselected target row by using the original data value for the first reselected target row based on the modification query (S710). For example, when the modification query includes the SET phrase such as 'SET C1=(SELECT SUM (T2·C1) FROM T2 WHERE T2·C1=T1·C1', the processor 130 may determine a sum of data values for row-specific C1 in another table T2 as a data value (i.e., the first data value for the first reselected target row) of the column C1 of at least one target row in which a data value of column C1(T2·C1) in another table T2 and the original data value of column C1(T1·C1) in the target table T1 coincide with each other.

The processor 130 determines a second data value for the first reselected target row based on the log information prestored for the first reselected target row (S720). For example, the processor 130 may determine a data value last modified in the log information for the column C1 of the target data table T1 as the second data value for the first reselected target row.

It is determined whether the first data value and the second data value coincide with each other (S730), and when the first data value and the second data value coincide with each other, the processor 130 maintains the data value for the first reselected target row as the second data value (S740). When the first data value and the second data value do not coincide with each other, the processor 130 updates the data value for the first reselected target row to the first data value (S750).

In various exemplary embodiments, when the modification query includes the type 5 UPDATE instruction statement, a non-deterministic function may output another result value even with an input value, so the processor 130 may perform the modification task for at least one reselected target row by the same method as described above in respect to the type 3 UPDATE instruction statement by referring to FIG. 6.

Meanwhile, referring back to FIG. 4, when the modification query includes the type 6 UPDATE instruction statement (i.e., the data value of the column used for selecting the target row in the WHERE phrase is changed in the SET phrase), the processor 130 performs the rollback for the modification task performed for at least one reselected target row (S430). The processor 130 may roll back the modification task previously performed for at least one reselected target row, and then terminate the operation for the UPDATE instruction statement.

Hereinafter, a method for performing the modification task by the processor when the modification query includes the type 3 UPDATE instruction statement will be described in detail with reference to FIGS. 8 to 13.

FIG. 8 is an exemplary diagram for describing a method for performing a data modification task at least simultaneously for multiple user terminals according to an exemplary embodiment of the present disclosure.

Referring to FIG. 8, a first transaction 800 may correspond to a task of modifying a target data table based on a modification query of a first user terminal (i.e., user 1) according to a time, and a second transaction 810 may correspond to a task of modifying the same target data table based on a modification query of a second user terminal (i.e., user 2) according to the time.

First, the processor 130 receives a modification query such as "UPDATE T1 SET C1=10 WHERE C1=1 AND C2=6" from the first user terminal (user 1) at a first time (Time 1). The processor 130 modifies a data value for C1 included in at least one target row in which a data value of C 1 of the target table T1 is '1' and a data value of C2 is '6' to '10' (success in update to ROW in which C1=1 and C2=6) at the second time. This will be described in detail with reference to FIGS. 9 and 10.

Figure 9B:
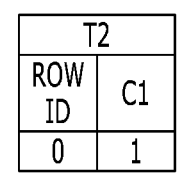
Figure 10B:
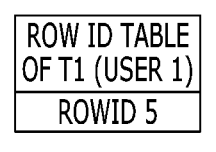

FIGS. 9A and 9B are exemplary diagrams illustrating an original data value of each target column included in a modification target data table according to an exemplary embodiment of the present disclosure, and FIGS. 10A and 10B are exemplary diagrams illustrating a modified target data table at the second time according to an exemplary embodiment of the present disclosure.

Referring to FIGS. 9A and 9B, FIG. 9A illustrates the first target data table T1 including ten target rows and FIG. 9B illustrates the second target data table T2 including one target row. Each target row of the first target data table T1 may include two target column C1 and C2, and each target row of the second target data table T2 may include one target column C1.

Referring to FIGS. 10A and 10B, FIG. 10A illustrates the first target data table T1 modified by the modification task of the processor 130 at the second time, and FIG. 10B illustrates a row ID table of the first target data table T1 generated by the modification task at the second time.

The processor 130 may determine a target row (i.e., a target row in which the row ID is 'ROWID 5') in which the data value for the target column C1 is '1' and the data value for the target column C2 is '6' in the first target data table T1 900 as illustrated in FIG. 9A, and modify the data value of C1 of the target row to '10' as illustrated in FIG. 10A at the second time. In this case, a lock owner for the first target data table T1 may be a 'first user terminal', an original data value '1' and a modified data value '10' may be recorded in log information of a target row for the 'first user terminal', and the row ID for the target row may be stored in the row ID table. In other words, the processor 130 may modify the target column C1 of ROWID 6 of the first target data table, store log information (10→1) for the modified target column C1, and store the row ID (ROWID 5) for the modified target column C1 in the row ID table of FIG. 10B.

Referring back to FIG. 8, when a query such as 'INSERT INTO T2(C1) VALUES (1)' is received from first user terminal at a third time (Time 3), the processor 130 may insert a new row in which the data value for the target column C1 of the target table T2 illustrated in FIG. 9B is '1' at a fourth time (Time 4). The target table T2 for which the modification task is performed may be represented as illustrated in FIG. 11.

Figure 11B:
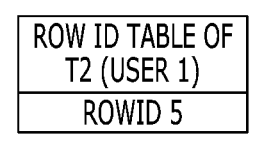

FIGS. 11A and 11B are exemplary diagrams illustrating a target data table modified by a processor at a third time according to an exemplary embodiment of the present disclosure.

Referring to FIGS. 11A and 11B, FIG. 11A illustrates the second target data table T2 modified by the modification task of the processor 130 at the third time, and FIG. 11B illustrates a row ID table of the second target data table T2 generated by the modification task at the third time.

The processor 130 may insert a new row (i.e., a row in which the row ID is 'ROWID 1') in which the data value for the target column C1 is '1' into the target table T2 at a fourth time. In this case, a lock owner for the second target data table T2 may be a 'first user terminal', a data value '1' may be recorded in log information of a target row for the 'first user terminal', and the row ID for the target row may be stored in the row ID table. In other words, the processor 130 may insert the column C1 of ROWID 5 into the second target data table, store log information 1 for the inserted column C1, and store the row ID (ROWID 1) for the inserted column C1 in the row ID table of FIG. 11B.

Referring back to FIG. 8, the processor 130 may receive a modification query such as "UPDATE T1 SET C2= (SELECT SUM(C1) FROM T2) WHERE C1<=2" from the second user terminal (user 2) at a fifth time (Time 5).

The processor 130 may perform the modification task for the first target data table based on the modification query of the second user terminal. This will be described in detail with reference to FIGS. 12A and 12B and 13A and 13B.

FIGS. 12A and 12B and 13A and 13B are exemplary diagrams illustrating a target data table modified by the modification query of the second user terminal according to an exemplary embodiment of the present disclosure.

Referring to FIGS. 12A and 12B, FIG. 12A illustrates a modified first target data table T1 when a modification task from ROWID 0 to ROWID 5 is performed by the modification query of the second user terminal after ROWID 5 is modified by the modification query of the first user terminal, and FIG. 12B illustrates a row ID table of the first target data table T1 generated by the modification task.

Referring to FIGS. 13A and 13B, FIG. 13A illustrates the modified first target data table T1 when the modification task for target rows reselected by the modification task of the first user terminal is performed, and FIG. 13B illustrates a row ID table of the first target data table T1 generated by the modification task.

Referring to FIGS. 12A and 12B and 13A and 13B, the processor 130 may determine a target row satisfying a modification condition in which the data value of the column C1 of the first target data table is equal to or smaller than 2, and allocate the data value of the target column C2 of the determined target row as the sum of the data values of the column C1 of the second target data table. For example, the processor 130 may determine rows from ROWID 0 to ROWID 4 in which the data value of C1 is equal to or smaller than 2 as the target row in the first target data table of FIG. 10A. The processor 130 may allocate the data values of the target column C2 of the respective rows from ROWID 0 to ROWID 4 as the C1 data value '1' of ROWID 0 in the second target data table of FIG. 11A.

The lock owner for the first target data table at the second time is the 'first user terminal' the lock owner for the second target data table at the fourth time is the 'first user terminal', but a commit instruction is not yet performed, so the processor 130 may allocate the data values of the target column C2 of the respective rows from ROWID 0 to ROWID 4 as '1' as illustrated in FIG. 12A. Here, the commit may mean an operation of terminating one transaction (e.g., update, delete, insert, etc.), and storing contents of the corresponding transaction in an actual database.

The processor 130 may store log information for the modified target column C2 for each of the rows from ROWID 0 to ROWID 4, and store the row IDs (from ROWID 0 to ROWID 4) for the modified target column C2 in the row ID table of FIG. 12B.

Since the target row of 'ROWID 5' is already modified by the modification task by the modification query of the first user terminal at the second time, the processor 130 may wait for the modification task by the modification query of the second user terminal for the target row of 'ROWID 5' at a sixth time (Time 6) until the modification task by the modification query of the first user terminal is terminated (wait by row lock). In other words, since the row lock owner is the first user terminal, the processor 130 may wait for the modification task by the modification query of the second user terminal until the commit is performed (i.e., until a seventh time (Time 7)).

When the modification task for the first user terminal is normally completed, the processor 130 may perform the commit at the seventh time. In this case, the processor 130 intends to perform the modification task for the target row of 'ROWID 5' at the seventh time, but the target row of 'ROWID 5' does not correspond to the modification condition of the UPDATE instruction statement included in the modification query of the second user terminal.

Therefore, the processor 130 may determine at least one reselected target row by reselecting the modification target among one or more target rows (i.e., target rows from ROWID 0 to ROWID 9) of the first target data table. For example, the processor 130 may determine the remaining target rows from ROWID 0 to ROWID 4 and the remaining target rows from ROWID 6 to ROWID 9 except for the target row of 'ROWID 5' as the reselected target rows.

Subsequently, the processor 130 may perform the modification task for the reselected target rows at an eighth time (Time 8). Specifically, the processor 130 may determine whether there is an already modified reselected target row among the reselected target rows while performing the modification task for the reselected target rows or at the time of performing the modification task for the reselected target rows. For example, the processor 130 may determine that the target rows from ROWID 0 to ROWID 4 are the already modified reselected target rows by identifying the row data table of FIG. 12B at the time of intending to perform the modification task for the target rows from ROWID 0 to ROWID 4.

The processor 130 may omit the modification task, perform the modification task, or perform the rollback task according to the type of UPDATE instruction statement included in the modification query of the second user terminal. Since the UPDATE instruction statement included in the modification query of the second user terminal corresponds to the type 3 UPDATE instruction statement, the processor 130 may perform the modification task by the method described above by referring to FIG. 6.

In this regard, specifically, the processor 130 may determine the first data value for the target column C2 of each of the target rows from ROWID 0 to ROWID 4 of the first target data table. Since the commit for the modification task by the modification query of the first user terminal is performed, the first data value for the target column C2 for each of the target rows from ROWID 0 to ROWID 4 of the first target data table may be allocated as '2'. In other words, the processor 130 may determine '2' which is the sum of the data values of the column C1 of the respective rows from ROWID 0 and ROWID 1 of FIG. 11A as the first data value.

Next, the processor 130 may determine the second data value for the target column C2 for each of the target rows from ROWID 0 to ROWID 4 of the first target data table based on the log information for each of the target rows from ROWID 0 to ROWID 4. For example, the processor 130 may determine '1' which is the most recently stored data value in the log information for each of the target rows from ROWID 0 to ROWID 4 of FIG. 12A as the second data value.

Since the first data value and the second data value do not coincide with each other, the processor 130 may modify the data value for the target column C2 of each of the target rows from ROWID 0 to ROWID 4 to '2' as illustrated in FIG. 13A.

Subsequently, since the undo log other than the original data value is not present in the log information for each of the target rows from ROWID 6 to ROWID 9, the processor 130 may modify the data value for the target column C2 of each of the target rows to '2' by conducting the modification task for the target rows from ROWID 6 to ROWID 9. The processor 130 may record the log information for each of the target rows from ROWID 6 to ROWID 9 as illustrated in FIG. 13A, and record the row ID for each of the target rows from ROWID 6 to ROWID 9 in the row ID table as illustrated in FIG. 13B. As such, when the modification task for the target rows from ROWID 0 to ROWID 9 is completed, the first target data table for which the modification task is completed may be illustrated as in FIG. 13A.

As such, according to the present disclosure, it is possible to minimize a time and cost required for modification tasks by multiple users, by omitting, performing, rolling back a modification task according to a type of an instruction statement included in a modification query without rolling back all previous modification tasks when rowset reset for target rows is performed during a modification task for a random data table by modification queries of multiple users.

Figure 14:
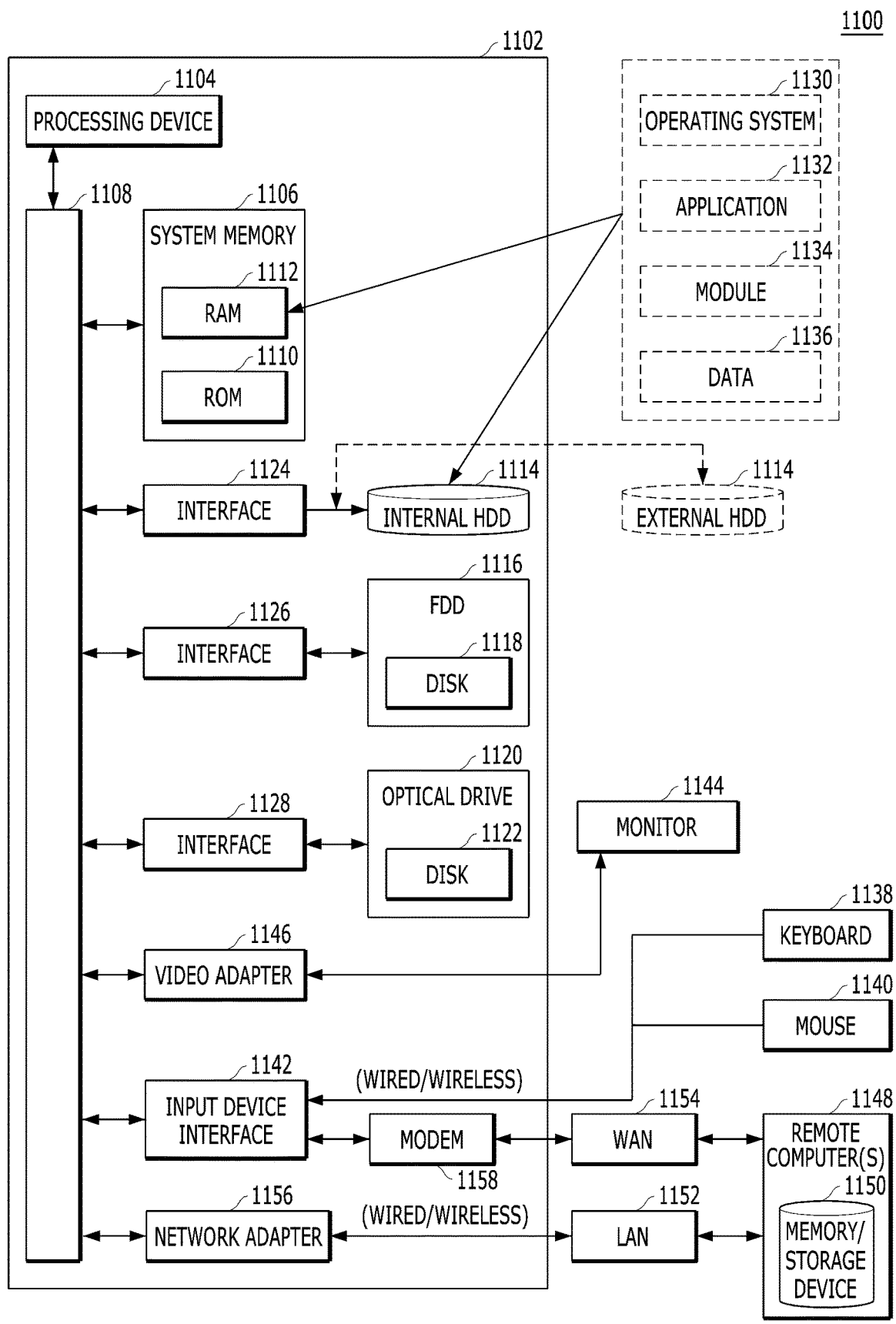
FIG. 14 is a simple and general schematic diagram illustrating an example of a computing environment in which the embodiments of the present disclosure are implementable.

FIG. 14 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a minicomputer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for updating data for multiple users in a database management system (DBMS), which is performed by a computing device, the method comprising:
    receiving a modification query for modifying at least one target row of a target data table from a user terminal, the at least one target row including one or more columns;
    determining whether there is an already modified target row during a modification task for the at least one target row;
    generating at least one reselected target row by reselecting a modification target in the at least one target row when there is the already modified target row;
    determining whether there is an already modified reselected target row during a modification task for the at least one reselected target row; and
    omitting the modification task for the at least one reselected target row, performing the modification task for the at least one reselected target row, or performing a rollback for the modification task for the at least one reselected target row according to the type of instruction statement included in the modification query when there is the already modified reselected target row.

2. The method of claim 1, wherein the instruction statement includes a SET phrase for designating the column to be modified or updated or a data value of the column for modification or update, or includes an UPDATE instruction statement including a WHERE phrase for designating the SET phrase and a condition, and
    the type of instruction statement included in the modification query includes at least one of a first type configured to modify the at least one target row by using a constant, a second type configured to modify the at least one target row by using at least one target column to be modified of a target data table to be modified, a third type configured to modify the at least one target row by referring to at least one column of another data table other than the target data table without using the at least one target column, a fourth type configured to modify the at least one target row by using the at least one target column and referring to at least one column of another data table other than the target data table, a fifth type configured to modify the at least one target row by using a random non-deterministic function, or a sixth type configured to change a data value of a column used for selecting a target row (rowset) in the WHERE phrase in the SET phrase.

3. The method of claim 2, wherein the omitting of the modification task for the at least one reselected target row, the performing of the modification task for the at least one reselected target row, or the performing of the rollback for the modification task for the at least one reselected target row according to the type of instruction statement included in the modification query includes
    omitting the modification task for the at least one reselected target row when the modification query includes the first type or second type UPDATE instruction statement, further includes performing the modification task for the at least one reselected target row when the modification query includes the third to fifth type UPDATE instruction statement, and further includes performing the rollback for the modification task the at least one reselected target row when the modification query includes the first to fifth type UPDATE instruction statement.

4. The method of claim 3, wherein the performing of the modification task for the at least one reselected target row includes determining a first data value for a first reselected target row among the at least one reselected target row based on the modification query when the modification query includes the third or fifth type UPDATE instruction statement, determining a second data value for the first reselected target row based on log information prestored for the first reselected target row, and determining whether the first data value and the second data value coincide with each other, and when the first data value and the second data value does not coincide with each other, updating the data value for the first reselected target row to the first data value, and further includes maintaining the data value for the first reselected target row to the second data value when the first data value and the second data value coincide with each other.

5. The method of claim 4, wherein the log information includes a data value updated last for the first reselected target row, and the determining of the second data value for the first reselected target row is determining the data value updated last as the second data value.

6. The method of claim 3, wherein the performing of the modification task for the at least one reselected target row includes acquiring the original data value for the first reselected target row from the log information prestored for the first reselected target row among the at least one reselected target row when the modification query includes the type 4 UPDATE instruction statement, determining a first data value for the first reselected target row by using the original data value based on the modification query, determining a second data value for the first reselected target row based on log information prestored for the first reselected target row, and determining whether the first data value and the second data value coincide with each other, and when the first data value and the second data value does not coincide with each other, updating the data value for the first reselected target row to the first data value, and further includes maintaining the data value for the first reselected target row to the second data value when the first data value and the second data value coincide with each other.

7. The method of claim 6, wherein the log information includes the original data value for the first reselected target row and a data value updated last for the first reselected target row, and the determining of the second data value for the first reselected target row is determining the data value updated last as the second data value.

8. The method of claim 1, wherein the determining of whether there is the already modified reselected target row includes determining a reselected target row having a row ID stored in the row ID table among the at least one reselected target row as the already modified reselected target row by using a prestored row ID table.

9. The method of claim 8, wherein the row ID table is configured to store a row ID for a row in which the data value is modified.

10. The method of claim 1, further comprising:
performing the modification task for at least one target row based on the modification query when the already modified target row is not present.

11. The method of claim 10, wherein the modifying of the at least one target row based on the modification query is modifying a data value for each of one or more target columns included in the at least one target row, respectively based on the type of instruction statement included in the modification query.

12. The method of claim 1, further comprising:
performing the modification task for at least one reselected target row based on the modification query when the already modified reselected target row is not present.

13. A non-transitory computer-readable storage medium storing a computer program, wherein the computer program allows one or more processors to execute the following operations for updating data for multiple users in a database management system (DBMS) when the computer program is executed by the one or more processors, the operations comprising:

an operation of receiving a modification query for modifying at least one target row of a target data table from a user terminal, the at least one target row including one or more columns;

an operation of determining whether there is an already modified target row during a modification task for the at least one target row;

an operation of generating at least one reselected target row by reselecting a modification target in the at least one target row when there is the already modified target row;

an operation of determining whether there is an already modified reselected target row during a modification task for the at least one reselected target row; and an operation of omitting the modification task for the at least one reselected target row, performing the modification task for the at least one reselected target row, or performing a rollback for the modification task for the at least one reselected target row according to the type of instruction statement included in the modification query when there is the already modified reselected target row.

14. A computing device for updating data for multiple users in a database management system (DBMS), comprising:
at least one processor; and
a memory,
wherein at least one processor is configured to
receive a modification query for modifying at least one target row of a target data table from a user terminal, the at least one target row including one or more columns,
determine whether there is an already modified target row during a modification task for the at least one target row, generate at least one reselected target row by reselecting a modification target in the at least one target row when there is the already modified target row, determine whether there is an already modified reselected target row during a modification task for the at least one reselected target row, and omit the modification task for the at least one reselected target row, perform the modification task for the at least one reselected target row, or perform a rollback for the modification task for the at least one reselected target row according to the type of instruction statement included in the modification query when there is the already modified reselected target row.

\* \* \* \* \*